United States Patent [19]
Johanns et al.

[11] Patent Number: 6,027,344
[45] Date of Patent: Feb. 22, 2000

[54] SIMULANT TRAINING KIT FOR RECOGNIZING HAZARDOUS MATERIALS

[75] Inventors: Keith J. Johanns, Upper Arlington; Gregory W. Bowen, Galena; Robert E. Wyant, Delaware, all of Ohio

[73] Assignee: Battelle Memorial Institute, Columbus, Ohio

[21] Appl. No.: 08/996,281

[22] Filed: Dec. 22, 1997

Related U.S. Application Data

[60] Provisional application No. 60/034,797, Dec. 31, 1996.

[51] Int. Cl.[7] .............................. G09B 19/00; G09B 23/24
[52] U.S. Cl. ........................... 434/219; 434/283; 434/298
[58] Field of Search ..................................... 434/218, 219, 434/285, 298, 226, 12.6, 12.7, 365, 428, 429, 368

[56] References Cited

U.S. PATENT DOCUMENTS

| | | | |
|---|---|---|---|
| 1,350,237 | 8/1920 | Porter | 434/298 |
| 1,430,849 | 10/1922 | Porter | 217/7 |
| 3,570,141 | 3/1971 | Koral | 434/283 |
| 5,537,752 | 7/1996 | Cornwell et al. | 33/1 SB |
| 5,746,603 | 5/1998 | Foster et al. | 434/219 |

*Primary Examiner*—Gene Mancene
*Assistant Examiner*—Michael B. Priddy
*Attorney, Agent, or Firm*—Klaus H. Wiesmann

[57] ABSTRACT

A training kit for training individuals to recognize one or more hazardous materials including a housing having dividing means within the housing dividing the housing into a plurality of compartments; each compartment having a set of container receiving portions; and container means in each of the container receiving portions of each of the compartments; indicia means associated with each compartment having identifying information, each container means in a compartment containing a simulant having one or more characteristics, the characteristics being perceptible to the individual; wherein the simulant mimics one or more characteristics of the hazardous material and the simulant is less hazardous than the hazardous material.

18 Claims, 4 Drawing Sheets

SIMULANT TRAINING KIT FOR RECOGNIZING HAZARDOUS MATERIALS

This application claims the benefits of U.S. Provisional Application No. 60/034,797 filed Dec. 31, 1996.

STATEMENT OF GOVERNMENT INTEREST

The invention was made under contract with an agency of the United States Government under contract No. SPO 900-94-D-0002. The United States Government has rights in this invention.

FIELD OF THE INVENTION

The invention relates to a simulant training kit, and a combination simulant classroom training kit, manual and protective gear. The kit is useful for instruction purposes in training law enforcement, military personnel, safety officers, firemen, managers and other personnel in the chemicals industry in the characteristics and identification of hazardous materials without the material being actually present. A major advantage of the invention is that personnel are not at risk of being exposed to the hazardous materials should breakage of a container or other unexpected event occur.

BACKGROUND OF THE INVENTION

Recent world events, such as the terrorist Sarin attack in Tokyo, the Federal building bombing in Oklahoma City, the bombing at the Olympics in Atlanta, attempts by paramilitary and terrorist organizations to disrupt national infrastructure, increased international and domestic drug production and trafficking, and accidental chemical spills, to name a few, have created heightened interest in training personnel to identify and appropriately handle hazardous and highly toxic materials. Instructive in this respect is a Nov. 4, 1996 article by Lois R. Ember in Chemical and Engineering News, pages 10–16. One of the areas identified in the article is the need for training especially for local responders such as police and fire departments. The need for training in identifying hazardous and highly toxic materials also exists in the private sector such as with producers in the chemical industry, with distributors in the transportation industry, and with end users.

Misconceptions exist as to the look, feel, smell, and other properties of hazardous materials. The very toxicity, danger, liability issues, and tight control associated with hazardous materials makes it difficult For personnel having a need to know about the materials to obtain access to the materials in a meaningful way. The present invention is designed to help fulfill these needs.

BRIEF DESCRIPTION OF THE INVENTION

Broadly, the invention provides for a training kit for training an individual to recognize hazardous materials. The training kit typically includes: a housing; a plurality of containers within said housing wherein, each container is identified with indicia for a hazardous material; said containers are grouped into one or more sets wherein containers in each respective set contain one or more simulant(s) that mimic similar physical characteristics of said hazardous materials. Typically the containers are vials and are preferably optically clear so that the user may easily view the contents; however, it is envisioned that certain embodiments may use opaque containers. Typically physical characteristics such as whether said hazardous material is a gas, liquid, or solid; color characteristics; and viscosity and flow characteristics are shown.

In another embodiment, the invention provides for a training kit for training an individual to recognize one or more hazardous materials including: a housing that contains dividing means within the housing for dividing the housing into a plurality of compartments; receiving means within each of the compartments for receiving one or more container means; container means in the receiving means, for holding a simulant; indicia means associated with the receiving means; for identifying the container means in the receiving means; the container means comprising a simulant for a hazardous material; wherein the simulant mimics one or more characteristics of the hazardous material. In one embodiment there is provided a lid for the housing with optional means for connecting the lid to the housing.

A preferred embodiment provides a training manual for use with the kit. Typically the kit training manual contains training materials and a pocket part for safety gloves for use by the trainee. In another embodiment the lid has one or more groups of written instructions thereon.

The training kit uses simulants that are less hazardous than the materials that are simulated. One set of containers in at least one compartment is typically transparent to provide a view of the contents of the container. In other typical embodiments the containers in at least one compartment are opaque to light as for example the odor containers. Physical characteristics such as whether the hazardous material is a liquid, solid, or gas, color, and so on can be seen in the transparent containers.

DETAILED DESCRIPTION OF THE INVENTION AND BEST MODE

Broadly the present invention discloses a hazardous materials simulant kit that fulfills a need to provide on hand experience and simulated access to hazardous materials in a meaningful way. There is a need for training personnel to recognize hazardous materials and to also reduce the risks associated with the presence of the actual hazardous materials themselves. The present invention is designed to help fulfill these needs.

For purposes of the present patent application hazardous materials include:

(1) chemicals on a toxic chemicals list such as the Toxic Substances List H. E. Christensen, Ed. (1974) and the like;

(2) chemicals used in industry such as starting material, intermediates, or end products that are dangerous to humans, animals, and/or plants. Some examples include: phosgene, nitrogen mustards, methyl isocyanate, benzene, polyvinyl chloride, ammonia, nitrates, bromides, strong acids and bases; chlorides; insecticides and herbicides, (e.g. parathion); and the like;

(3) biological materials and biological warfare agents such as: viral (e.g. Venezuelan Equine Encephalitis virus); bacterial (e.g. bacillus anthracis (anthrax)); fungal agents; toxins (ricin); and the like;

(4) controlled drugs that are often abused such as cocaine, crack, opium, heroin, LSD, morphine and the like;

(5) chemical warfare agents such as choking agents, nerve agents, blood agents, blister agents, vomiting agents such as Soman (GD) (pinacolyl methylphosphonofluoridate) a nerve agent; Sarin (GB) (isopropyl-methyl-phosphonofluoridate) a nerve agent; Distilled Mustard (HD) (bis-[β-chloroethyl]sulfide) a blister agent; 2Lewisite (L) (dichloro-[2-chlorovinyl] arsine) a blister agent; (VX) (O-ethyl-S-[2-(diisopropylaminoOethyl]methylphophonothiotate) a nerve agent; chemicals in Field Manual FM 3-9 having Navy designation NAVFAC P-467 and Air Force designation 355-7 "Potential Military Chemical /Biological Agents and Compounds; and the like.

Note that the designations GD, TGD, VX, GB, HD, and L refer to standard U.S. government designations for the respective chemical warfare agents. To illustrate the toxicity of some of the agents, gas warfare agents such as Sarin (GB), Soman (GD), and tabun (GA) have a lethal dose for humans of only about 0.01 mg/kg, all three appear to have toxic effects similar to parathion but the effects are much more severe; phosgene (odor of new mown hay or green corn) which is used in industry for the preparation of many organic chemicals has a lethal dose in rats of 50 ppm and in humans is an insidious poison that is not irritating immediately even when fatal concentrations are inhaled.

The present invention provides several advantages. First, by actually seeing, handling, and smelling the simulants, learning and retention of the properties associated with hazardous materials is improved compared to just presenting a listing of information about hazardous or toxic materials. Second, the present invention allows the use of materials that are much less hazardous, than those for which personnel are being trained to handle, as ingredients in the simulants. It is important to note that the simulants used herein are also comprised of chemicals or mixtures of chemicals that may present some hazard in themselves. The key, however, is that the chemicals selected for use and actually present in the training kit will be selected to be less hazardous and preferably much less hazardous than the chemicals which are being simulated. Thus the danger associated with having a highly hazardous or highly toxic material actually present in the training area is reduced to the negligible or acceptable level.

Examples of Simulant Formulations

1. Soman (GD) unthickened simulant—Formamide was determined to have substantially the same properties for visual inspection (color, viscosity, flow properties, and so on) as unthickened Soman. Ten grams of formamide were placed in an appropriately marked visual simulant container. Oil of Bergamot was determined to have the same odor characteristics as Soman. Glycerol, a colorless odorless liquid was chosen as the carrier. Ten grams of glycerol and 25 μg of oil of Bergamot were placed in an appropriately marked odor simulant container.

2. Thickened Soman (TGD) simulant—a 9:1 mixture of dimethyl acetamide and cellulose acetate butyrate were determined to have substantially the same properties for visual inspection as thickened Soman. One gram of cellulose acetate butyrate and nine grams of dimethyl acetamide were placed in an appropriately marked visual simulant container. The same amount of glycerol and oil of Bergamot as for unthickened Soman were placed in an appropriately marked odor simulant container.

3. Tx 60 (VX) simulant—a mixture with a ratio of 10 g of tetramethylene sulfone to 115 mg of water was determined to have substantially the same visual characteristics as the agent Tx 60 (VX). Since VX is odorless, the vial for the odor simulant container was left empty except for the absorbent foam material.

4. Sarin (GB) simulant—anisole was determined to have substantially the same visual characteristics as the nerve agent Sarin (GB). Accordingly, 10 g of anisole were placed in an appropriately marked visual simulant container. Since Sarin is essentially odorless, the vial for the odor simulant container was left empty except for the absorbent foam material.

5. Distilled Mustard (HD) simulant—a mixture of 10 g of phenyl ether and 78 mg of dimethylacetamide was determined to have substantially the same visual characteristics except for color. A small amount of Fat brown B, 0.1 μg, was added to this mixture as a coloring agent. This mixture was placed in an appropriately marked visual simulant container. A mixture of 10 g of Diethylene glycol and 15 μl of alyll disulfide was determined to have the same odor characteristics as HD. Accordingly 10 g of this mixture placed in appropriately marked odor simulant container.

6. Lewisite (L) simulant—dimethyl sulfoxide was determined to have substantially the same visual characteristics as Lewisite except for color A small amount of Fat brown B, 0.1 μg, was added to 10 g of the dimethyl sulfoxide as a coloring agent. This mixture was placed in an appropriately marked visual simulant container. A mixture of 25 μl of geraniol and 10 g of distilled water were determined to have the same odor characteristics as Lewisite. Ten grams of the latter mixture were added to an appropriately marked odor simulant container.

Visual and odor characteristics were obtained from government reports such as "Potential Military Chemical/Biological Agents and Compounds" (Army Manual No. FM-3-9), (Navy Manual No. NAVFAC P-467), Air Force Manual No. 355-7) (available from Commandant, U.S. Army Chemical School, ATTN: ATZN-CM-NF, Fort McClellan, Ala. 36205-5020) and from chemical information available in the open literature such as The Merck Index, M. Windholz,et al Ed., Merck & Co., Rahway, N.J. (1996); Material Safety Data Sheets that are provided by each manufacturer of a chemical, and chemical information available from Chemical Abstracts Service, Columbus, Ohio; U.S.A. Physical characteristics and odor characteristics were simulated based on these criteria.

Ingredients for several typical formulations for chemical warfare simulants are summarized below in Tables 1 and 2:

TABLE 1

| Ingredients for Visual Simulants | | |
|---|---|---|
| Simulant for | Material (Amount) | |
| GD | Formamide (10 g) | |
| TGD | Cellulose acetate butyrate (1 g) | Dimethyl acetamide (9 g) |
| VX | Tetramethylene sulfone (10 g) | Water (115 mg) |
| GB | Anisole (10 g) | |

TABLE 1-continued

Ingredients for Visual Simulants

| Simulant for | Material (Amount) | | |
|---|---|---|---|
| HD | Phenyl ether (10 g) | Dimethyl Acetamide (78 mg) | Fat Brown B (0.1 µg) |
| L | Dimethyl sulfoxide (10 g) | Fat Brown B (0.1 µg) | |

GD - simulant for unthickened nerve agent - Soman
TGD - simulant for thickened nerve agent - Soman
VX - simulant for nerve agent - Tx 60
GB - simulant for nerve agent - Sarin
HD - simulant for blister agent - Distilled Mustard
L - simulant for blister agent - Lewisite

TABLE 2

Ingredients for Odor Simulants

| Odor Simulant for | Material (amount) | |
|---|---|---|
| GD Odor | Glycerol (10 g) | Oil of Bergamot (25 µl) |
| TGD Odor | Glycerol (10 g) | Oil of Bergamot (25 µl) |
| VX Odor | Empty | (Odorless) |
| GB Odor | Empty | (Odorless) |
| HD Odor | Diethylene Glycol (10 g) | Allyl disulfide (15 µl) |
| L Odor | Distilled water (10 g) | Geraniol (25 µl) |

GD - simulant for unthickened nerve agent - Soman
TGD - simulant for thickened nerve agent - Soman
VX - simulant for nerve agent - Tx 60
GB - simulant for nerve agent - Sarin
HD - simulant for blister agent - Distilled Mustard
L - simulant for blister agent - Lewisite Those skilled in the art will appreciate that similar simulants for other toxic and hazardous materials can easily be prepared. The method is as follows:

(1) choose the important characteristics of the toxic or hazardous material that are to be simulated (e.g. visual, odor);

(2) choose appropriate materials that will mimic the chosen characteristics of the hazardous material, from chemical tables and manuals (e.g. The Merck Index and others).

Figure 1:
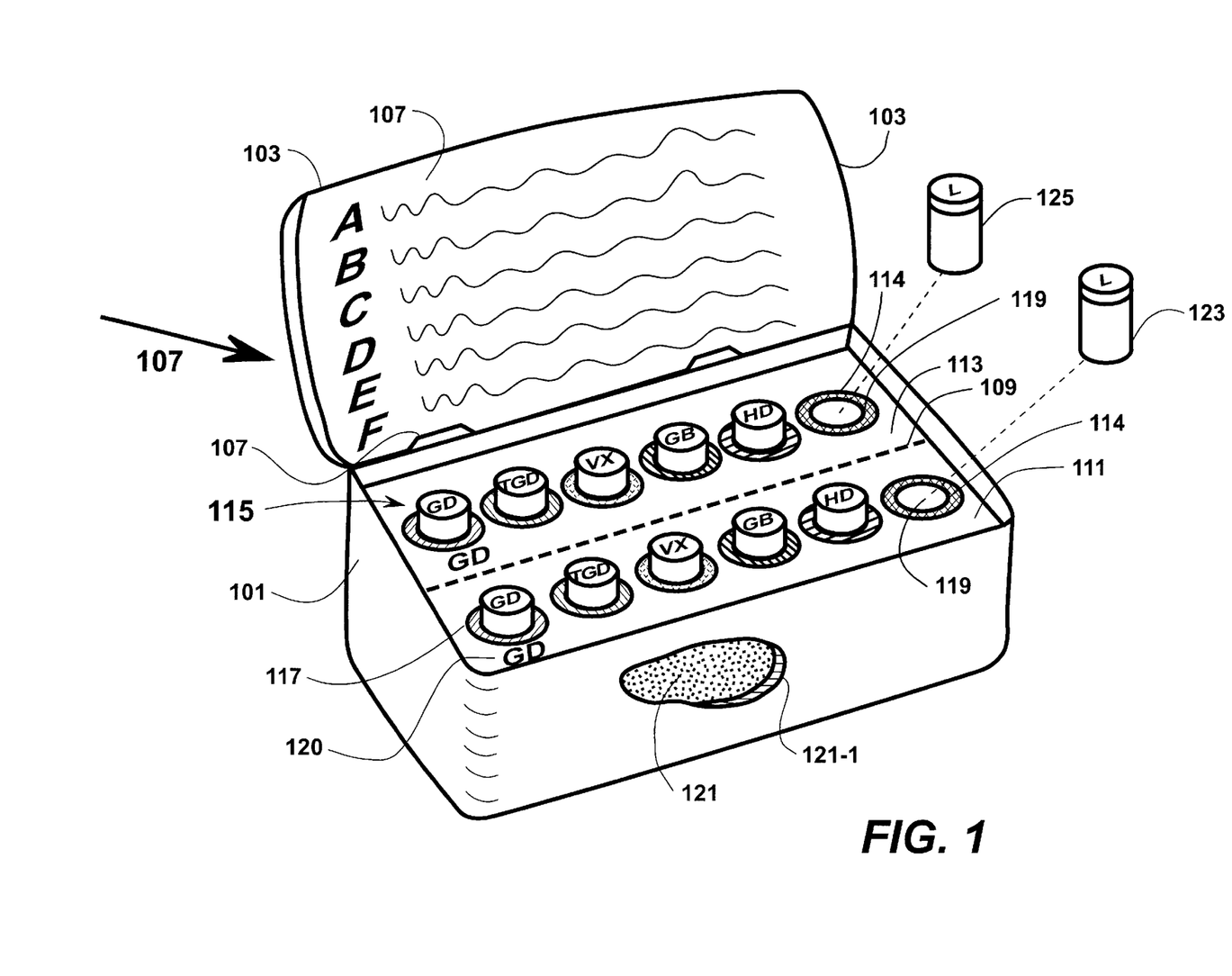
FIG. 1 shows an oblique view of a preferred embodiment of the kit.
Figure 2:
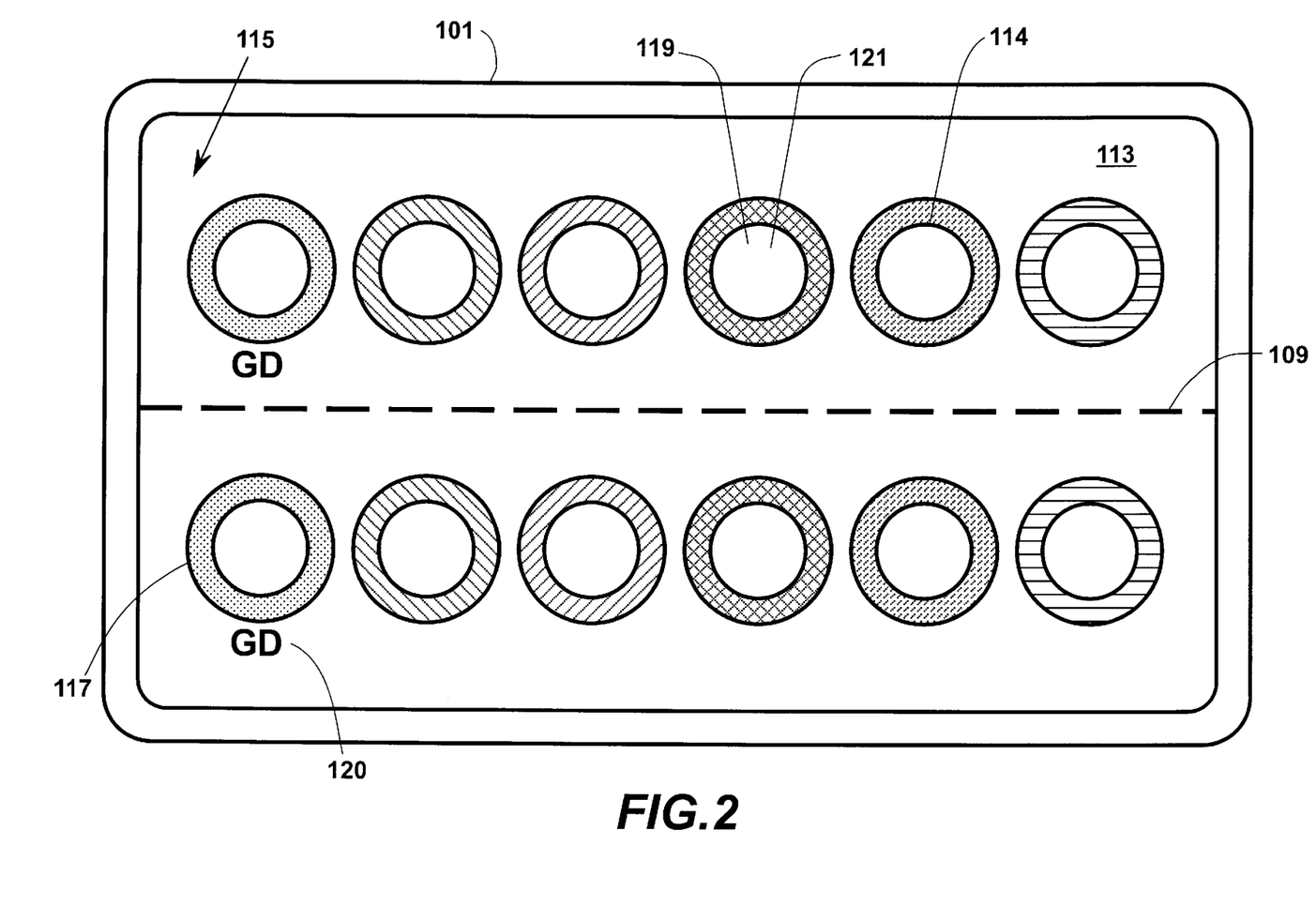
FIG. 2 shows a top view of the kit with the lid 103 removed.

Referring now to FIGS. 1 and 2, the kit 100 typically includes a housing 101 of a strong supporting material such as metal, wood, or plastic. Typically a lid 103 of a similar material having optional hinge means 105 for holding the lid 103 to the housing is used. Preferably the housing 101 and lid 103 are formed of a polymeric material such as plastic. A cardboard or plastic template 107 may be used inside the lid 103 to provide an area for applying printed instructions or other information. A cardboard or plastic template (not shown) may also be fastened to the outside of the is lid 103 or outside the housing 101. Means 109 are provided for dividing the housing interior into a plurality of compartments. The means 109 may typically be printed indicia such as a line, a raised surface or border, in other cases merely grouping and spacing apart with a space will suffice to designate the compartments. Two such typical compartments 111, 113 are shown. Typically cardboard or plastic template 115 is used to indicate the compartments and to provide a surface for applying identifying indicia. The identifying indicia can include color coded areas 117 (for matching the containers to the container receiving portions 119) and lettering numbering or other indicia 120. Holes 114 for the containers 123,125 in the template 115 are preferably slightly larger than the containers 123,125 so that the containers can easily be inserted into the material below the template 115. Typically the lower portion of housing 100 is filled with a protective material 121, preferably a foam material having a container receiving portion 119. The protective material 121 may also be shredded and formed paper of plastics. The protective foam material 121 has a container receiving portion 119 therein that is slightly smaller in diameter than the container 123,125 in order that a container is held in place yet can easily be removed by pulling. Cutaway portion 121-1 shows the foam 121. Foam 121 is preferably held in place with spray adhesive Super 77 Aerosol Adhesive made by 3M Corporation, Minneapolis, Minn. While other adhesives may be used, this adhesive has shown the best long term performance and is preferred. The foam material 121 has the additional benefit of protecting the containers from shock and breakage.

In the embodiment shown in FIGS. 1 and 2, a first compartment 111 typically houses containers 123 containing a simulant used to teach visual (or other) characteristics of the hazardous materials. A second compartment 113 typically houses containers 125 used for odor (or other) characteristics. Each simulant used for visual characteristic training should reproduce at least the most important (e.g. viscosity, color) and preferably substantially all of the visually ascertainable physical characteristics of the hazardous material. The list of important visually ascertainable characteristics typically include:

(1) whether the hazardous material is in the gas, liquid or solid phase at certain temperatures, particularly room temperature;

(2) if the hazardous material is a liquid, its viscosity and flow properties;

(3) if the hazardous material is a solid whether it is a powder or a solid chunk, whether it appears amorphous or crystalline, and if crystalline the crystalline appearance structure; and the like;

(4) the color of the hazardous material.

Other physical characteristics that can be ascertained include density. Still further physical and visual characteristics that can be simulated will readily appear to those skilled in the art.

For the odor characteristics in containers 125 in the second compartment 113, it is important to mimic the major odor attributes of each hazardous material. If desired, in other typical embodiments, reactions such as tearing, sneezing, or coughing after smelling the simulant by the trainee can be evolved by the addition of appropriate ingredients.

Figure 3:
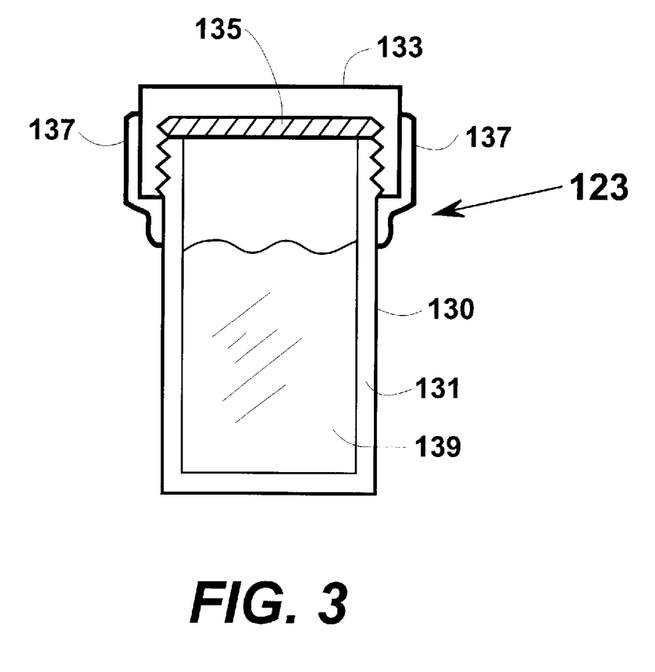
FIG. 3 shows a cutaway view of a typical container for visual analysis of the sample therein.

FIG. 3 shows details of a typical container 123 useful for training in the visual physical characteristics of the hazardous materials. Preferably the container 123 is a glass or plastic vial 130 with clear walls 131 so that the contents 139 can readily be ascertained. A cap 133 having typically an inner seal 135 (preferably a Teflon wafer) is used to close the container and is preferably permanently sealed. A permanent seal 137 may typically be glue or other sealer (preferably silicone bond such as General Electric RTV bathtub caulk is used) between tie cap 133 and vial 131 (not shown) and/or a shrink wrap material or other sealant 137 around the cap 133 and vial 123. Presently both methods of sealing are used as it is often the impulse to open a vial that appears openable. The presence of the outer seal alerts the user that the vial is not to be opened. Alternatively, a method of sealing that cannot be opened can be used, such as a nonopening cap.

Figure 4:
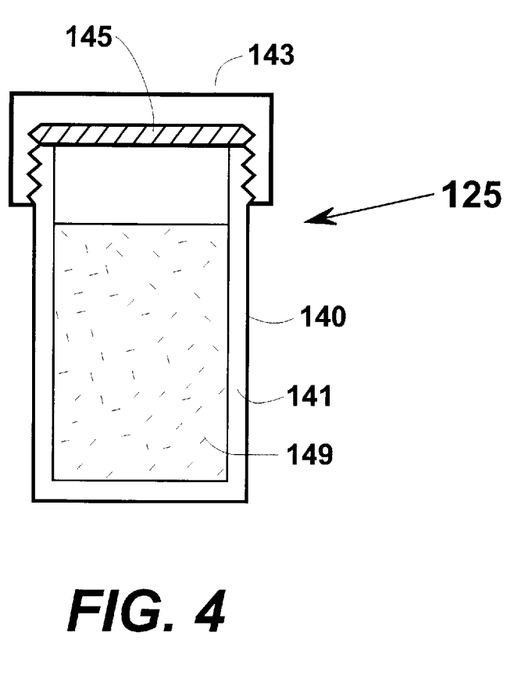
FIG. 4 shows a cutaway view of a typical container for odor analysis of the sample therein.

FIG. 4 shows a typical container 125 useful for training the odor characteristics of the hazardous materials. Preferably the container 125 is a glass or plastic vial 140 with colored (preferably brown) or opaque walls 141 or has an opaque lining (not shown) at the inner or outer surface of the wall 141. While in some embodiments the walls 140 may be clear or translucent it is presently believed that not allowing the trainee to see and be influenced by the contents of the odor containing vials will enhance training. A cap 143 typically having an inner seal 145 (preferably a Teflon wafer) is used to seal the container 125. (Container 125 is made to be easily opened and closed to provide access to the odoriferous material. Within container 125 is an absorbent material 149 that holds the odoriferous material. Any inert material able to absorb the odoriferous material can be used, typically foamed plastics can be used and a closed cell polyethylene foam is preferable.

It will now be appreciated by those skilled in the art that a further embodiment can include one or more compartments where each compartment has various variations in the visual characteristics of only one hazardous chemical that could be encountered, examples of which include but are not limited to:

(1) gradations in viscosity or flow properties;
(2) gradations in color;
(3) the various physical forms and properties listed above.

One or more compartments that illustrate variations in odoriferous characteristics likely to be encountered for the different physical forms are also contemplated. This is exemplified by those that can be both solids and liquids (e.g. spores disseminated as a powder or as an aerosol from a liquid suspension).

Figure 5:
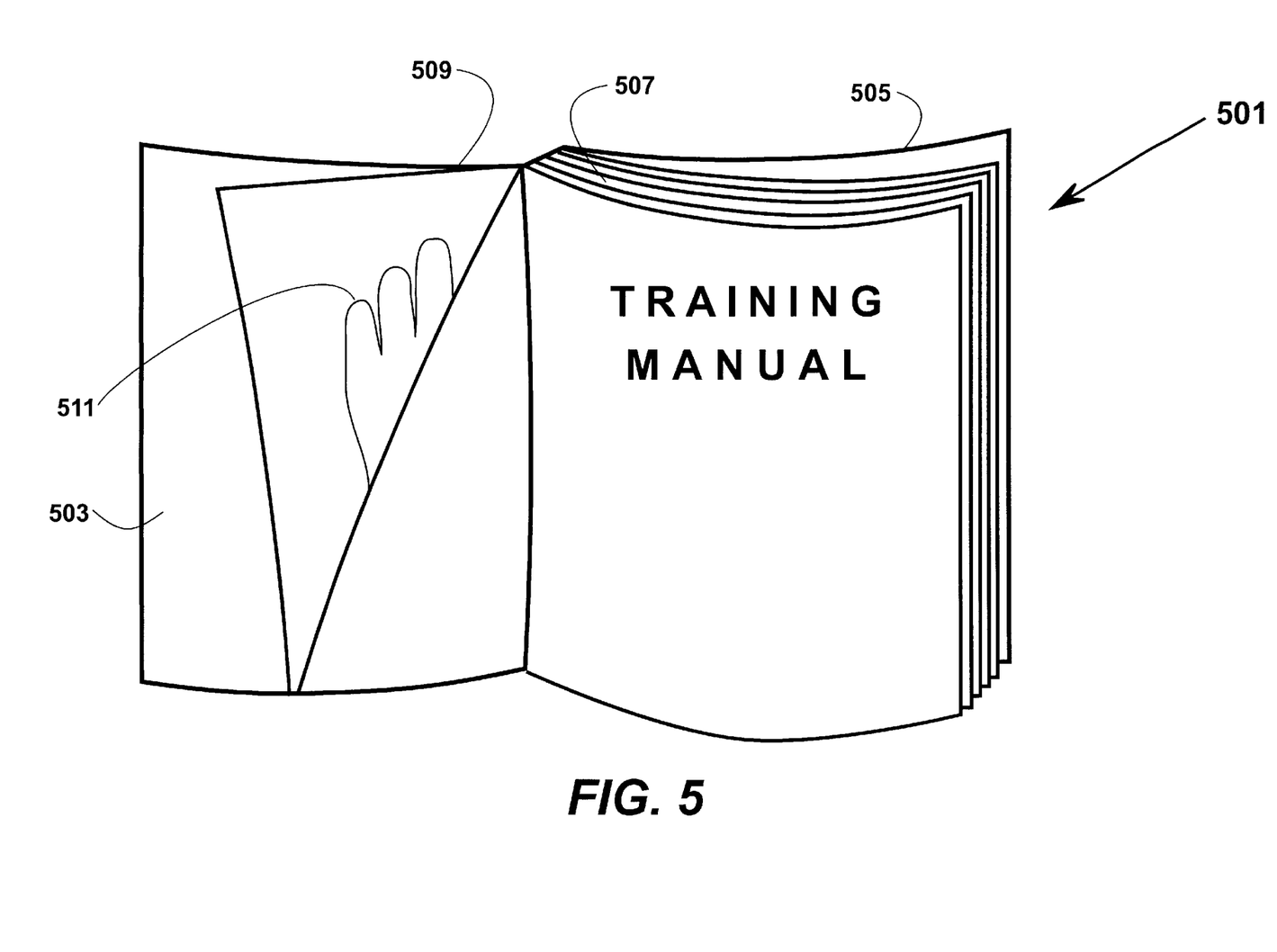
FIG. 5 shows a manual containing user information and/or safety instructions for use with the kit, including a built in storage compartment for rubber safety gloves or other equipment.

FIG. 5 shows a view of a manual 501 useful with the present invention. The manual 501 typically includes a front cover 503, a back cover 505, textual or other teaching material 507, and a compartment 509 for storing and carrying protective gloves 511 and the like. Safety instructions concerning the materials used in the containers 123, 125 (e.g. material safety data sheets—MSDS) are also contemplated to be included, in case the vials containing the simulant materials break.

In some embodiments for use in remote areas, or for long term stability, it may be desirable to include other ingredients such as stabilizers, antioxidants, and or antibacterial agents. In any event it should be recognized that in the long term the simulants will be subjected to the environment which over time can change the odiferous, physical and other characteristics of the simulant. Thus the kit should be reasonably protected from the environment and fresh ingredients for the containers are recommended on a planned schedule.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. A training kit for training an individual to recognize chemical warfare agents comprising:

a housing comprising;

dividing means within said housing for dividing said housing into a plurality of compartments;

receiving means within each of said compartments for receiving one or more container means;

container means in said receiving means, for holding a simulant, said container means identified with indicia for chemical warfare agents, wherein said container means in at least one compartment are transparent and provide a view of the contents of said container means, said container means containing a first simulant that mimics the physical characteristics of said chemical warfare agents, and said container means in at least one compartment are opaque to light, said opaque containers containing a second simulant that mimics the odor characteristics of said chemical warfare agents.

2. The training kit according to claim 1, further comprising:

a lid for said housing.

3. The training kit according to claim 2, further comprising:

means for connecting said lid to said housing.

4. The training kit according to claim 1, also comprising a training manual.

5. The training kit according to claim 4, wherein said training manual comprises training materials and a pocket part for safety gloves.

6. The training kit according to claim 2, further comprising:

said lid having groups of written instructions thereon.

7. The training kit according to claim 1, wherein said simulants are less hazardous than said chemical warfare agents.

8. The training kit according to claim 1 wherein at least one compartment contains vials showing whether said chemical warfare agent is a gas, liquid, or solid.

9. The training kit according to claim 1, wherein at least one compartment contains vials showing color characteristics of said chemical warfare agent.

10. The training kit according to claim 1, wherein at least one compartment contains vials showing viscosity and flow characteristics of said chemical warfare agent to be identified.

11. The training kit according to claim 1, wherein said chemical warfare agent that is simulated comprises a liquid chemical warfare agent.

12. A training kit for training an individual to recognize chemical warfare agents comprising:

a. a housing;

b. a plurality of containers within said housing wherein (i) each of said containers is identified with indicia for a chemical warfare agent;

(ii) said containers are grouped into one or more sets wherein said containers in each respective set contain one or more simulant(s) that mimic similar characteristics of said chemical warfare agents, and wherein one set of said containers is transparent and contains simulants that mimic physical characteristics of said chemical warfare agents, and a second set of said containers is opaque arid contains simulants that mimic odor characteristics of said chemical warfare agents.

13. The training kit of claim 12 wherein said containers comprise vials.

14. The training kit of claim 12 wherein at least one of said containers is substantially optically clear.

15. The training kit according to claim 12 wherein at least one set comprises vials showing whether said chemical warfare agent is a gas, liquid, or solid.

16. The training kit according to claim 12, wherein at least one set comprises vials showing color characteristics of said chemical warfare agent.

17. The training kit according to claim 12, wherein at least one set comprises vials showing viscosity and flow characteristics of said characteristics of said chemical warfare agent to be identified.

18. The training kit according to claim 12, wherein said chemical warfare agent that is simulated comprises a liquid chemical warfare agent.

\* \* \* \* \*

UNITED STATES PATENT AND TRADEMARK OFFICE
CERTIFICATE OF CORRECTION

PATENT NO : 6,027,344
DATED : February 22, 2000
INVENTOR(S): Keith J. Johanns, Gregory W. Bowen, and Robert E. Wyant It is certified that error appears in the above-identified patent and that said Letters Patent are hereby corrected as shown below:

On the title page item,

[57] ABSTRACT, line 2, "hazardous materials" should be deleted.

[57] ABSTRACT, line 2, after "more" insert -- chemical warfare agents --.

[57] ABSTRACT, lines 2 and 3, "having dividing means within the housing dividing the housing" should be deleted .

[57] ABSTRACT, line 2, after "a housing" insert -- divided --.

[57] ABSTRACT, line 5, after "portions; and" insert -- a --.

[57] ABSTRACT, line 5, "means" should be deleted.

[57] ABSTRACT, line 7, "means" should be deleted.

[57] ABSTRACT, line 7, after "each" insert -- container --.

[57] ABSTRACT, line 7, "compartment" should be deleted.

[57] ABSTRACT, line 8, after "information " insert -- for a chemical warfare agent --.

[57] ABSTRACT, line 8, "means" should be deleted.

[57] ABSTRACT, line 10, after the first occurrence of "characteristics" insert -- of the chemical warfare agents --.

UNITED STATES PATENT AND TRADEMARK OFFICE
CERTIFICATE OF CORRECTION

PATENT NO : 6,027,344
DATED : February 22, 2000
INVENTOR(S): Keith J. Johanns, Gregory W. Bowen, and Robert E. Wyant It is certified that error appears in the above-identified patent and that said Letters Patent are hereby corrected as shown below:

[57] ABSTRACT, lines 11 through 13, "; wherein the simulant mimics one or more characteristics of the hazardous material and the simulant is less hazardous than the hazardous material" should be deleted.

Column 3, line 13, "2Lewisite" should be -- Lewisite --.

Column 5, line 60, "the is lid" should be -- the lid --.

Column 6, line 65, "tie" should be -- the --.

Column 8, line 61 "arid" should be -- and --.

Signed and Sealed this

Third Day of April, 2001

*Attest:*

NICHOLAS P. GODICI

*Attesting Officer*     Acting Director of the United States Patent and Trademark Office